United States Patent [19]

Howell

[11] Patent Number: 5,149,143
[45] Date of Patent: Sep. 22, 1992

[54] CONNECTOR ASSEMBLY WITH DETACHABLE SLEEVE

[75] Inventor: Robert M. Howell, Houston, Tex.

[73] Assignee: National-Oilwell, Houston, Tex.

[21] Appl. No.: 698,359

[22] Filed: May 8, 1991

Related U.S. Application Data

[63] Continuation of Ser. No. 383,101, Jul. 20, 1989, abandoned.

[51] Int. Cl.$^5$ .............................................. F16L 21/00
[52] U.S. Cl. ..................................... 285/18; 285/364;
285/366; 285/404; 285/414; 285/141
[58] Field of Search ............... 285/140, 305, 308, 309,
285/406, 408, 18, 365, 366, 407, 410, 421, 414,
364, 141, 404, 142-148, 90, 115

[56] References Cited

U.S. PATENT DOCUMENTS

| | | | |
|---|---|---|---|
| 2,295,716 | 9/1942 | Cox | 285/410 |
| 2,417,025 | 3/1947 | Volpin | 285/421 X |
| 2,512,294 | 6/1950 | Arbogast | 285/366 |
| 2,726,104 | 12/1955 | Boitnott et al. | 285/90 X |
| 2,868,565 | 1/1959 | Suderau | 285/406 X |
| 3,155,401 | 11/1964 | Musolf | 285/309 X |
| 3,390,901 | 7/1968 | Bibb | 285/406 |
| 3,602,532 | 8/1971 | Ehrenberg | 285/364 |
| 3,827,728 | 8/1974 | Hynes | 285/309 X |
| 4,063,758 | 12/1977 | Westberg | 285/364 |
| 4,068,865 | 1/1978 | Shanks, II | 285/309 X |
| 4,074,912 | 2/1978 | Van Bilderbeek et al. | 285/309 X |
| 4,094,539 | 6/1978 | Reimert | 285/309 |
| 4,114,928 | 9/1978 | Lochte | 285/309 X |
| 4,330,140 | 5/1982 | Hampton | 285/90 X |
| 4,460,201 | 7/1984 | McGugan | 285/18 |
| 4,606,557 | 8/1986 | Coffey | 285/404 |
| 4,640,530 | 2/1987 | Abbes et al. | 285/408 X |
| 4,660,869 | 4/1987 | Gabus | 285/365 |

FOREIGN PATENT DOCUMENTS 433895 9/1926 Fed. Rep. of Germany ...... 285/408
444939 3/1936 United Kingdom ................ 285/365

OTHER PUBLICATIONS

Composite Catalog 1976-1977, pp. 1268-1271; copyright 1985.

Primary Examiner—Randolph A. Reese
Assistant Examiner—Timothy Aberle
Attorney, Agent, or Firm—David A. Rose

[57] ABSTRACT

The connector assembly includes a clamp having a segmented latch ring radially disposed therein and mating hubs on tubular members to be connected. A downwardly facing shoulder of the clamp engages the upwardly facing shoulder of an end hub on one of the tubular members. The segmented latch ring includes a plurality of latch segments having a T-slot for receiving actuator screws which, when rotated, cause the latch ring segments to move radially inward to engage a downwardly facing shoulder on an end hub of the other tubular member. Upon actuation, the hubs are compressed together for connecting the tubular members.

14 Claims, 3 Drawing Sheets

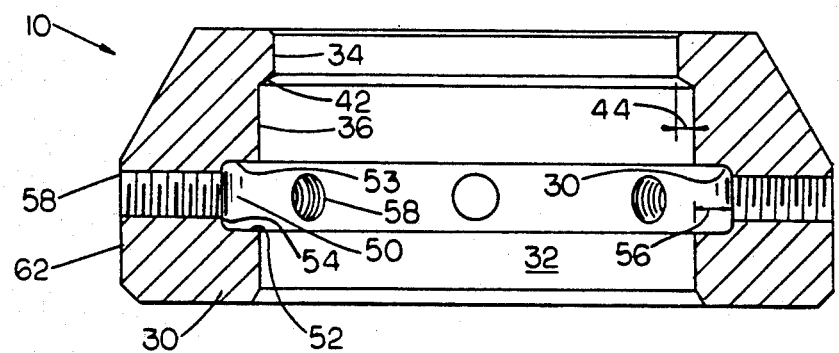
FIG. 4
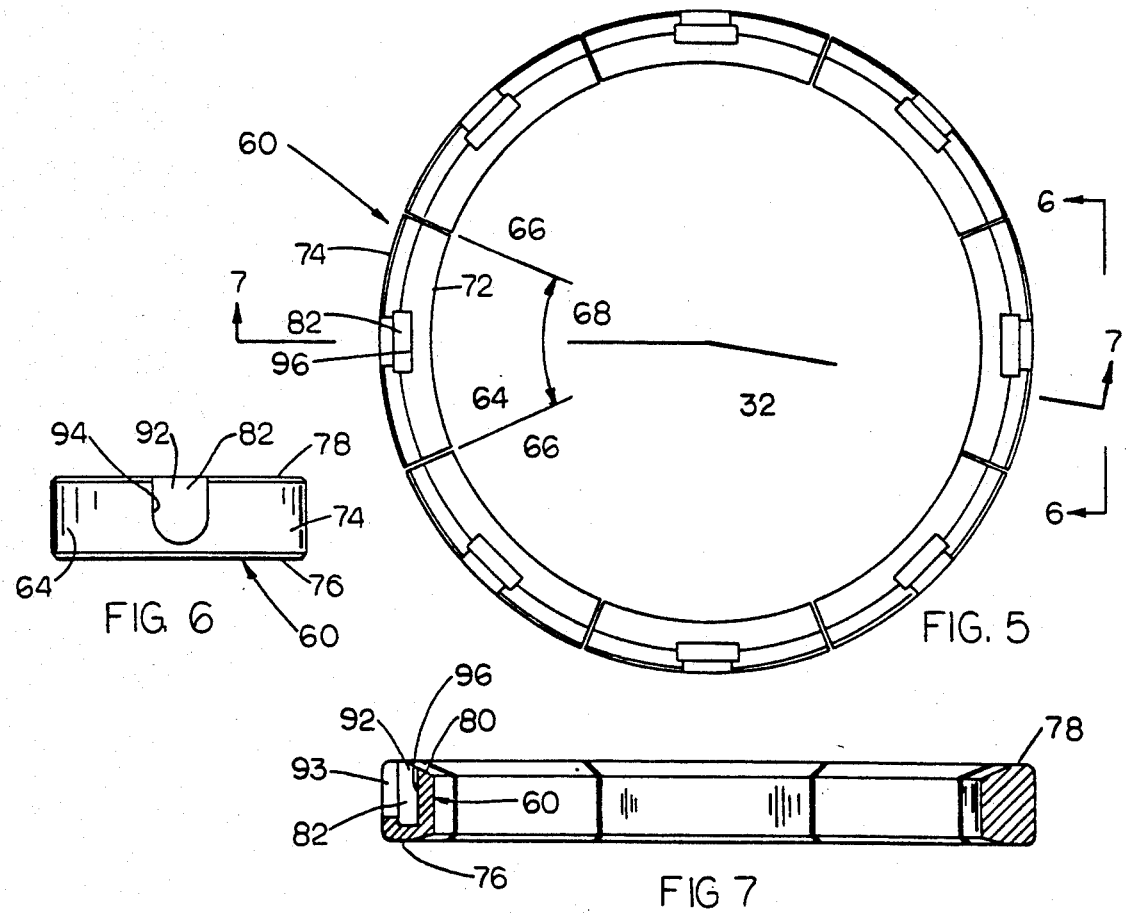
FIG. 6
FIG. 5
FIG 7

CONNECTOR ASSEMBLY WITH DETACHABLE SLEEVE

This is a continuation of copending application Ser. No. 07/383,101, now abandoned, filed on July 20, 1989.

BACKGROUND OF THE INVENTION

The present invention is broadly directed to joints and connectors for pipe and conduit ends, more particularly to a connector assembly for the connection of oilfield tubular members, and more particularly still to hub connectors for securing wellhead equipment.

Oilfield equipment, such as wellheads, hubs, adaptor sleeves, spools and the like, typically include an annular flange at their ends which mate with a similar annular flange on an adjacent sleeve, hub, wellhead, etc. Likewise, tubular goods, such as pipeline pipe, distribution piping, and the like, may include tubular sections having flanged tubular segments. By mating adjacent annular flange portions, the longitudinal flow bores are aligned for fluid passage through the casing, casing hangers, production casing, drill pipe, and the like. The mating flanges typically include a plurality of circumferentially spaced apertures or studs for bolting the mating flanges together. See the 1976-77 *Composite Catalog of Oil Field Equipment & Services* published by World Oil at 1268 (1976). The joint, or interface, of the flanges is subject to wellbore pressure, which commonly exceeds several thousand pounds per square inch.

Another prior art hub connector is an articulated "C" clamp connector. This connector has two generally C-shaped cross-sections which form opposed circumferential grooves which receive mating annular hubs. The hubs have a tapered rear surface, and the circumferential groove has a mating circumferential surface which engages the rear surface of the hubs. As a result, as the clamp connector is tightened over the mating hubs the radial movement of the connector is translated into a compressive force around the hub interface. The connector is articulated such that it may be placed over the junction of the two hubs after the equipment has been mated together. Clamp connectors of this type are manufactured by Cameron Iron Works of Houston, Texas. See the 1976-77 *Composite Catalog of Oil Field Equipment & Services* published by World Oil at 1269-1271 (1976).

Another prior art device, a split ring connector, is disclosed in U.S. Pat. No. 4,460,201 to McGugan. This connector includes a 360° split ring which allows the connector to be expanded over the mating annular flanges of adjacent hubs. The connector is maintained by a shive placed over projections on the ring adjacent the split.

These prior art connections require bolt alignment and continued adjustments to complete the connection. This process is time consuming and may take too long to secure the well in an emergency.

The present invention overcomes the deficiencies of the prior art.

SUMMARY OF THE INVENTION

The present invention is a connector assembly for tubular members comprising a clamp having an axisymmetric body with a segmented latch ring having a plurality of latch segments for connecting mating hubs on the adjacent tubular members. A downwardly facing shoulder of the clamp engages the upwardly facing flank of one end hub on one tubular member to be connected to another end hub on the other tubular member. Each of the latch segments has a T-slot for receiving actuator screws which, when rotated, cause the latch ring segments to move radially inward to engage a downwardly facing surface of one of the hubs. A snap ring may be provided to retain the clamp in position. The present invention permits a quick, efficient connection with a minimum of manipulation of heavy tubular equipment to locate and align studs to secure the mating tubular members.

This, and other objects and advantages of the invention, will become apparent from the following description of the preferred embodiment, when read in conjunction with the drawings.

BRIEF DESCRIPTION OF THE DRAWINGS

For a detailed description of a preferred embodiment of the invention, reference will now be made to the accompanying drawings wherein:

FIG. 4 is a cross-sectional side view of the clamp body of the connector assembly of FIG. 1;

FIG. 5 is a top view of the latch ring segments of FIG. 1 in the extended or actuated position;

FIG. 6 is a side view of one of the latch ring segments of FIG. 5;

FIG. 7 is a cutaway view of the latch ring segments of FIG. 5 at plane 7—7; and

BRIEF DESCRIPTION OF THE PREFERRED EMBODIMENT

Figure 1:
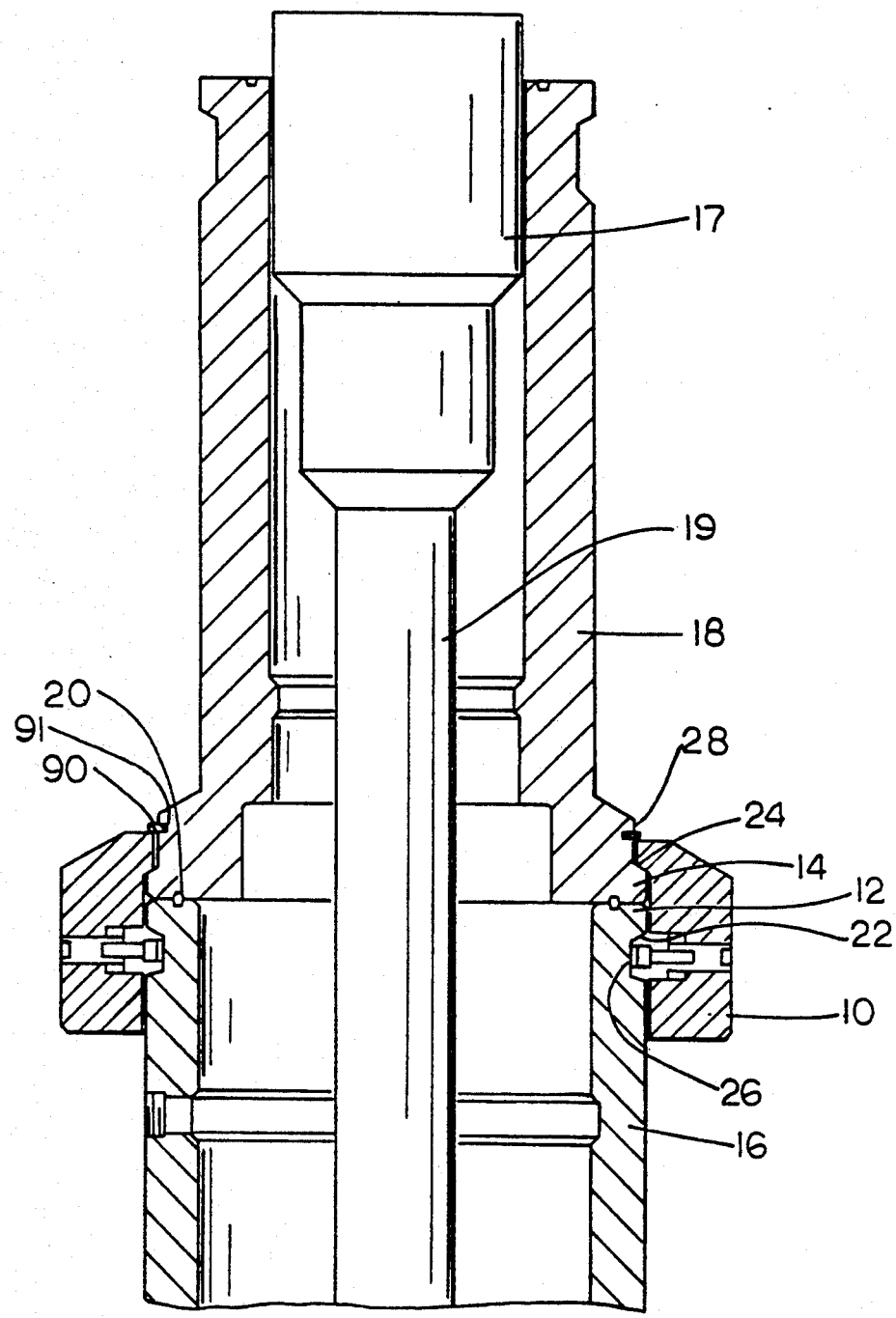
FIG. 1 is a cross-sectional view of a portion of a typical wellhead assembly illustrating the connector assembly of the present invention attaching an upper wellhead to a lower wellhead.
Figure 2:
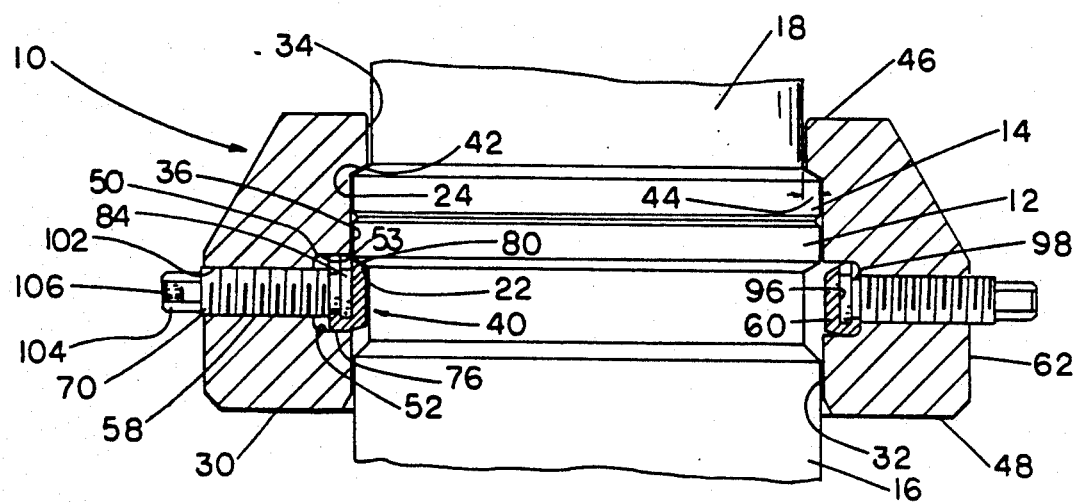
FIG. 2 is a detailed cross-sectional view of the connector assembly of FIG. 1 showing the latch ring segments in both the unactuated and actuated positions.

Referring initially to FIGS. 1 and 2, the connector assembly of the present invention includes a hub clamp 10 disposed over and matingly engaging two juxtaposed annular hubs 12, 14 on lower wellhead 16 and upper wellhead 18, respectively. Although FIGS. 1 and 2 illustrate the connection of upper wellhead 18 to lower wellhead 16, the connector assembly may be used as a connection for any two tubular members such as for a riser connection, wellhead connection, bonnet connection, BOP spool connection, or other tubular connection. It should be appreciated that the connector assembly of the present invention may be adapted to connect any two tubular members having mating annular hub surfaces. The configuration of clamp body 30 may be varied to meet the physical size and strength requirements of a particular application without deviating from the scope of the invention.

The clamp 10 includes a ring 40 of a plurality of latch segments 60. A downwardly facing shoulder 42 of the clamp 10 engages the upwardly facing shoulder 24 of the end hub 14 on the upper wellhead 18 to be connected to the lower wellhead 16. Each of the latch segments 60 has a T-slot 82 for receiving actuator screws 70 which, when rotated, causes the upwardly facing surface 80 of the latch ring segments 60 to move radially inwardly to engage a downwardly facing shoulder 22 on the lower wellhead hub 12.

Annular end hub 12 is disposed on the upper terminal end of lower wellhead 16. Annular end hub 14 is disposed on the lower terminal end of upper wellhead 18, upper wellhead 18 serving as an extension of the lower wellhead 16 for supporting a hanger 17 suspending a string of casing 19 within the well. The opposing terminal ends of lower wellhead 16 and upper wellhead 18 are concentric to the flow axis and may include a standard metal seal 20 disposed therebetween. Annular end hubs 12, 14 each have tapering frustoconical shoulders 22, 24, respectively, for mating engagement with clamp 10. An annular land 28 is formed above end hub 14 of upper wellhead 18. The downwardly facing frustoconical shoulder 22 of lower wellhead 16 is formed, in this particular embodiment, by an annular groove 26 adapted for receiving the latch segments 60 of clamp 10. Annular groove 26 is dimensioned to receive latch segments 60 in their fully actuated and extended position.

Referring now to FIG. 4, clamp 10 includes an axisymmetrical body 30 having an inner axial bore 32 dimensioned to receive upper wellhead 18. Inner bore 32 includes an upper reduced diameter bore 34 having an inner diameter slightly greater than the outer diameter of annular land 28 of upper wellhead 18. Reduced diameter bore 34 increases to a lower enlarged diameter bore 36 having a diameter slightly greater than the outer diameter of annular hubs 12, 14 so as to slidingly receive hubs 12, 14 upon assembly. A downwardly and outwardly tapering, downwardly facing shoulder 42 is formed by the diameter change between bores 34, 36 and serves as bearing surface for mating engagement with upwardly facing shoulder 24 of annular hub 14 of upper wellhead 18. Downwardly facing shoulder 42 has a horizontal bearing diameter 44. Downwardly facing shoulder 42 forms a downwardly facing frustoconical bearing surface for supporting body 30 against the back flank or shoulder 24 of hub 14. The end surfaces of upper and lower ends 46, 48 of annular body 30 are parallel to each other and are perpendicular to the flow axis of bore 32.

An annular groove 50 is formed in clamp body 30 below shoulder 42 in enlarged bore 36 for receiving latch segments 60 best shown in FIG. 2. Groove 50 is generally rectangular in cross section, having opposed lower and upper parallel faces 52, 53, and an inner groove face 54, concentric with bore 36 and providing a depth 56 sufficient for fully receiving latch segments 60 in their retracted position. A series of tapped or threaded apertures 58 are evenly circumferentially spaced around clamp body 30, projecting radially from groove face 54 to the external periphery 62 of clamp body 30. The number of segments will vary depending upon the size of the connection and the pressure rating of the connection.

Figure 3:
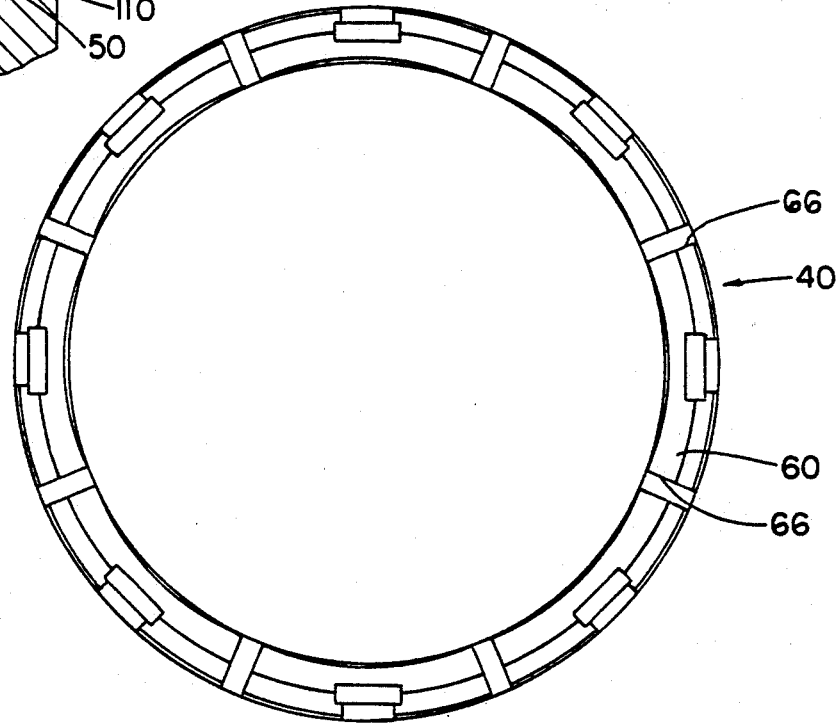
FIG. 3 is a top view of the latch ring segments of FIG. 1 in the retracted or unactuated position.

Referring now to FIGS. 2 and 3, a series of chordal latch ring segments 60 are dimensioned for disposal within groove 50 of clamp body 30, and an actuation screw 70 attached to each of segments 60, as hereinafter described, and adapted for threaded engagement within each of the tapped apertures 58.

As best shown in FIGS. 3, 5, 6 and 7, each latch ring segment 60 has an arcuate body 64 with a pair of abutment sides 66 having a planar angular displacement 68, shown in FIG. 5. An inner latch face 72 extends along the inner face of the chordal section between ends 66 toward inner bore 32, and an outer latch face 74, concentric therewith, extends along the outer chordal face of each latch ring segment 60 toward inner groove face 54. The bottom 76 of latch ring segment 60 bears against lower parallel face 52 of groove 50. The top 78 of latch ring segment 60 slidingly engages and aligns with upper parallel face 53 of groove 50. Top 78 further includes an upwardly facing frustoconical shoulder 80 having a matching profile for engagement with downwardly facing shoulder 22 of hub 12 of lower wellhead 16

As best shown in FIGS. 6 and 7, outer latch face 74 includes a T-slot 82 for receiving the head 84 of an actuation screw 70, shown in FIG. 2, threadingly received in apertures 58. T-slot 82 includes a lead slot 92 extending longitudinally along outer latch face 74 and a reduced width slot 93 forming a retaining wall 94.

As shown in FIG. 2, actuator screw 70 includes a head 84 having a bearing groove 98 therearound to receive retaining wall 94 of T-slot 82. The outer diameter of head 84 is slightly smaller than the diameter of lead slot 92, and the inner diameter of bearing groove 98 is slightly smaller than the reduced width slot 93 of T-slot 82. Thus, as actuator screw 70 is rotated, the terminal end of head 84 bears against the inner thrust face 96 of lead slot 92 and maintains a substantially constant diametrical relationship between latch ring segment 60 and actuator screw 70.

Actuator screw 70 further includes threads 102 along its midportion for threaded engagement with tapped aperture 58 and wrench flats 104 on that end of actuator screw 70 opposite head 84. Wrench flats 104 include an Allen wrench socket 106 for rotating actuator screw 70 in threaded aperture 58.

Referring now to FIGS. 2, 3, and 5, there is shown the various actuation positions of latch ring segments 60. Each latch ring segment 60 is disposed in groove 50, and is radially actuable therein. In the unactuated or retracted position shown in FIG. 3 and in the right-hand position of FIG. 2, latch ring segments 60 are retracted into groove 50 such that lower latch face 76 rides against lower groove face 52, and outer latch face 74 is retracted into groove 50 such that it is retained diametrically outward from the face of inner bore 32 of annular body 30. Latch ring segments 60 are retained in this position when clamp is placed over or removed from the junction of hubs 12, 14.

To connect hubs 12, 14, clamp 10 is disposed over the hubs 12, 14, such that reduced diameter bore 34 slidingly receives annular land 28, until downwardly facing frustoconical shoulder 42 on clamp 10 engages upwardly facing frustoconical shoulder 24 on hub 14. A retainer ring 90 may be disposed in an annular groove 91 in land 28 to retain clamp 10 in its lowermost position. Clamp body 30 is sized such that when connector shoulder 42 is engaged with hub shoulder 24, latch ring segments 60 forming a ring 40 are disposed in groove 50 below downwardly facing frustoconical shoulder 22 on hub 12. Actuator screw 70 is then rotated, causing the inward radial actuation thereof in threaded apertures 58, thereby actuating and moving latch segments 60 radially inward into inner bore 32 and causing upwardly facing frustoconical shoulder 80 to engage downwardly facing frustoconical shoulder 22 on hub 12 to compress hubs 12, 14 together. To support the load induced onto latch ring 40, the lower face 76 of latch segments 60 bear on parallel face 52 of groove 50. As shoulder 80 on latch ring segments 60 and shoulder 22 on hub 12 are frustoconical surfaces, radial inward actuation of latch shoulder 80 relative to hub 12 causes the longitudinal loading of hub 12 relative to hub 14 which is held substantially fixed by latch shoulder 42.

To remove clamp 10 from lower wellhead 16 and upper wellhead 18, actuator screws 70 are backed out of threaded apertures 58 with head 84 bearing against retaining wall 94, thereby pulling latch ring segments 60 radially out of inner bore 32 and retracted into groove 50, thereby releasing the compression on hubs 12, 14.

Figure 8:
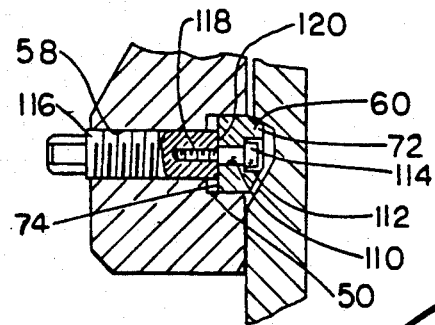
FIG. 8 is a cross-sectional view of an alternative embodiment of the actuator screw shown in FIG. 2.

Latch ring segment 60 may be actuable by means other than the T-slot 82 and actuator screw 70 type connection. For example, latch ring segment 60 may be actuable from the surface such as hydraulically thereby eliminating the requirement for threaded apertures 58. Also, there is shown in FIG. 8, an alternative connection between the actuator screw 70 and latch ring segments 60. The T-slot 82 is replaced with an aperture 110 extending through latch segment 60. A counterbore 112 is provided through inner latch face 72 to receive a cap screw 114. The head of cap screw 114 bears against the shoulder formed by counterbore 112 with aperture 110. Actuator screw 70 is replaced with actuator screw 116 which, instead of having a head 84, includes a threaded aperture 118 for threadingly receiving the threads of cap screw 114. The inner end 120 of actuator screw 116 bears on the outer latch face 74 to move latch segment 60 radially inward as screw 116 is rotated. As actuator screw 116 is backed out of aperture 58, the head of cap screw 114 bears against the shoulder of counterbore 112 to retract latch segment 60 into groove 50. Further, the threaded apertures 58 may be deleted, and a spring or other mechanism may be employed to actuate the latch ring segments 60 out of the groove 50.

Although a preferred embodiment of the invention has been described, it should be appreciated by those skilled in the art that the number and configuration of the latch ring segments and the annular body may be modified without deviating from the scope of the present invention. The clamp 10 of the present invention provides a unitary construction which is easily fitted or removed from abutting hub surfaces. It should be appreciated that the present invention is not limited to lower wellhead equipment but is applicable to any hub connection.

While a preferred embodiment of the invention has been shown and described, modifications thereof can be made by one skilled in the art without departing from the spirit of the invention.

I claim:

1. A connector for connecting a first annular member having a generally cylindrical body with an enlarged diameter portion forming an external end hub having a first shoulder with a second annular member having a second shoulder, comprising:

an integral ring forming an annular wall with an enlarged bore and a reduced diameter portion extending radially inward from said annular wall and forming a reduced bore, said enlarged bore sized to slidingly receive that generally cylindrical body and external end hub of the first annular member and the second shoulder of the second annular member, said reduced diameter portion sized to only slidingly receive the generally cylindrical body whereby said reduced diameter portion engages the first shoulder;

an annular recess disposed in said annular wall adjacent said enlarged bore and at an axial distance from said reduced diameter portion greater than the axial distance between the first and second shoulders; and a circumferentially extending arcuate shoulder having means for radial reciprocation on said annular wall within said recess between a retracted position disposed within said recess and an extended position extending from said recess for engaging the second shoulder for clamping the shoulders of the annular members between said reduced diameter portion and said arcuate shoulder.

2. The connector of claim 1, wherein said recess is a circumferential groove receiving said arcuate shoulder in its retracted position.

3. A connector for connecting a first annular member having a generally cylindrical body with an enlarged diameter portion forming an external end hub having a first shoulder with a second annular member having a second shoulder, comprising:

an integral ring forming an annular wall with an enlarged bore and a reduced diameter portion extending radially inward from said annular wall and forming a reduced bore, said enlarged bore sized to slidingly receive the generally cylindrical body and external end hub of the first annular member and the second shoulder of the second annular member, said reduced diameter portion sized to only slidingly receive the generally cylindrical body whereby said reduced diameter portion engages the first shoulder;

an annular recess disposed in said annular wall adjacent said enlarged bore and at an axial distance from said reduced diameter portion greater than the axial distance between the first and second shoulders; and a retainer radially actuably mounted on said annular wall within said recess between a retracted position disposed within said recess and an extended position extending from said recess for engaging the second shoulder for clamping the shoulders of the annular members between said reduced diameter portion and said retainer, said retainer including a plurality of segments completely disposed in said recess in said retracted position.

4. The connector of claim 3, further including means for actuating said segments.

5. The connector of claim 3, wherein said latch ring segments are radially actuated by at least one actuator screw threadingly engaged with said body.

6. A connector for connecting a first annular member having a generally cylindrical body with an enlarged diameter portion forming an external end hub having a first shoulder with a second annular member having a second shoulder, comprising:

an integral ring forming an annular wall with an enlarged bore and a reduced diameter portion extending radially inward from said annular wall and forming a reduced bore, said enlarged bore sized to slidingly receive the generally cylindrical body and external end hub of the first annular member and the second shoulder of the second annular member, said reduced bore sized to only slidingly receive the generally cylindrical body whereby said reduced diameter portion engages the first shoulder;

an annular recess disposed in said annular wall adjacent said enlarged bore and at an axial distance from said reduced diameter portion greater than the axial distance between the shoulders of the annular members;

a retainer radially actuably mounted within said annular wall for engaging the second shoulder of the end second annular member for clamping the shoulders of the annular members between said reduced diameter portion and said retainer;

said retainer including a plurality of segments disposed in said recess and said segments being radially actuated by at least one actuator screw threadingly engaged with said annular wall;

said segments having a retaining slot therein for rotatably receiving said actuator screw.

7. The connector of claim 6, wherein said retainer has a frustoconical shoulder oriented to face said reduced diameter portion.

8. The connector of claim 6, wherein said reduced diameter portion has a frustoconical shoulder adapted to engage one end hub.

9. The connector of claim 6, wherein said actuator screw includes a shaft having flat surfaces adapted for actuation by an actuation tool.

10. A connector assembly, comprising:
a first annular member having an annular body with an outwardly extending radial annular hub having a first shoulder;
a second annular member having a second shoulder;
a clamp having a bore forming an interior circumferential surface and disposed around said shoulders, said clamp having an inwardly directed shoulder engaging said first shoulder and a plurality of latches reciprocally disposed in an annular recess in the interior circumferential surface of said clamp and disposed axially opposite said first shoulder for engaging said second shoulder; and
means for radially reciprocating each of said latches on said clamp between an unengaged position where said latches do not engage said second shoulder and an engaged position where said latches engage said second shoulder.

11. A connector assembly, comprising:
a first annular member having an annular body with an outwardly extending radial annular hub having a first shoulder;
a second annular member having a second shoulder, said second annular member including an annular groove adjacent said second shoulder;
a clamp having a bore forming an interior circumferential surface and disposed around said shoulders, said clamp having an inwardly directed shoulder engaging said first shoulder and a plurality of latches reciprocally disposed about the interior circumferential surface of said clamp and disposed axially opposite said first shoulder for engaging said second shoulder; and
means for reciprocating each of said latches on said clamp between an unengaged position where said latches do not engage said second shoulder and an engaged position where said latches engage said second shoulder, said latches being received within said groove and engaging said shoulder in said engaged position.

12. The connector assembly of claim 11 wherein said clamp includes a tubular body having an axial length extending from said first hub and over said annular groove.

13. A connector assembly, comprising:
a first annular member having an annular body with an outwardly extending radial annular hub having a first shoulder;
a second annular member having a second shoulder;
a clamp having an annular wall forming a bore and disposed around said shoulders, said clamp having an inwardly directed shoulder engaging said first shoulder and a latch reciprocally disposed on said annular wall of said clamp and disposed axially opposite to said second shoulder for engaging said second shoulder;
means for reciprocating said latch on said clamp between an unengaged position where said latch does not engage said second shoulder and an engaged position where said latch engages said second shoulder;
said latch including a plurality of arcuate segments each rotatably disposed on the end of an actuator screw threaded into said annular wall.

14. The connector assembly of claim 13 wherein each of said arcuate segments includes a tapered surface for engaging said second shoulder.

* * * * *